United States Patent
Dufrancatel et al.

(10) Patent No.: US 11,780,975 B2
(45) Date of Patent: Oct. 10, 2023

(54) METHOD FOR PREPARING A COMPOSITE MATERIAL MADE FROM NATURAL LIGNOCELLULOSIC FIBERS HAVING IMPROVED RHEOLOGICAL PROPERTIES AND REDUCED EMISSIONS OF ODORS AND VOLATILE ORGANIC COMPOUNDS

(71) Applicants: FAURECIA INTERIEUR INDUSTRIE, Nanterre (FR); AUTOMOTIVE PERFORMANCE MATERIALS, Fontaine-les-Dijon (FR)

(72) Inventors: Laurence Dufrancatel, Herblay (FR); Hassane Boudhani, Beauvais (FR); Jeremie Lebihan, Fontaine-les-Dijon (FR); Nicolas Coiffier, Fontaine-les-Dijon (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 854 days.

(21) Appl. No.: 16/393,509

(22) Filed: Apr. 24, 2019

(65) Prior Publication Data
US 2019/0322821 A1    Oct. 24, 2019

(30) Foreign Application Priority Data
Apr. 24, 2018 (FR) ..................... 18 53563

(51) Int. Cl.
| | | |
|---|---|---|
| C08J 5/04 | (2006.01) | |
| B29B 7/90 | (2006.01) | |
| B29C 45/00 | (2006.01) | |
| B29B 7/92 | (2006.01) | |
| C08J 5/06 | (2006.01) | |
| B29K 201/00 | (2006.01) | |
| B29L 31/30 | (2006.01) | |
| B29K 101/12 | (2006.01) | |
| C08L 97/02 | (2006.01) | |

(52) U.S. Cl.
CPC ............... C08J 5/045 (2013.01); B29B 7/90 (2013.01); B29B 7/92 (2013.01); B29C 45/0005 (2013.01); C08J 5/06 (2013.01); *B29K 2101/12* (2013.01); *B29K 2201/00* (2013.01); *B29L 2031/30* (2013.01); *C08J 2323/16* (2013.01); *C08J 2497/02* (2013.01); *C08L 97/02* (2013.01)

(58) Field of Classification Search
None
See application file for complete search history.

(56) References Cited

U.S. PATENT DOCUMENTS

| | | |
|---|---|---|
| 2012/0083555 A1 | 4/2012 | Korte |
| 2013/0137798 A1 | 5/2013 | Piccin |
| 2013/0298814 A1 | 11/2013 | Militz et al. |
| 2014/0291894 A1* | 10/2014 | Kannengiesser ....... C08L 23/14 264/328.17 |
| 2016/0186382 A1 | 6/2016 | Nikkilä et al. |

FOREIGN PATENT DOCUMENTS

| | | | |
|---|---|---|---|
| JP | 2007283489 A | * | 11/2007 |
| JP | 5864078 B2 | * | 2/2016 |
| JP | 5864078 B2 | | 2/2016 |
| WO | WO2012047565 A2 | | 4/2012 |
| WO | WO2014181036 A1 | | 11/2014 |

OTHER PUBLICATIONS

French Search Report corresponding to French application No. FR1853563, dated Feb. 15, 2019, 2 pages.

* cited by examiner

*Primary Examiner* — Benjamin A Schiffman
(74) *Attorney, Agent, or Firm* — REISING ETHINGTON P.C.

(57) ABSTRACT

A method for preparing a composite material that includes the steps of: (i) heat treating natural lignocellulosic fibers at a temperature of 130 to 320° C. for 2 minutes to 24 hours in an atmosphere oxygen-deficient in and in the presence of water vapor, and (ii) mixing the heat treated natural lignocellulosic fibers with at least one thermoplastic polymer in the molten state and whose melting point is less than or equal to 230° C. The method is useful for producing vehicle parts from a composite material having natural lignocellulosic fibers with reduced volatile organic compound odor emissions.

14 Claims, No Drawings

METHOD FOR PREPARING A COMPOSITE MATERIAL MADE FROM NATURAL LIGNOCELLULOSIC FIBERS HAVING IMPROVED RHEOLOGICAL PROPERTIES AND REDUCED EMISSIONS OF ODORS AND VOLATILE ORGANIC COMPOUNDS

The present invention relates to a method for preparing a composite material based on natural lignocellulosic fibers, the composite material as obtained, as well as its uses, in particular for the manufacture of parts in the automotive field.

Various composite materials based on lignocellulosic natural fibers useful for the preparation of interior parts for automobiles are commercially available or described in the literature.

The main obstacles to the use of composite materials based on natural lignocellulosic fibers in the automotive interior are that they generally emit odors and volatile organic compounds (VOC), and are too viscous to be injected to make large parts such as door panel parts and dashboards. VOC include methanol, acetic acid and furfural. These emissions may be troublesome especially for the driver or passengers of a vehicle equipped with parts prepared from such composite materials.

The application US 2013/137798 describes a method for preparing a composite material based on a thermoplastic polymer and lignocellulosic natural fibers, wherein the method comprises the heat treatment of the fibers at a temperature above 160° C. in an oxygen-deficient atmosphere. This heat treatment reduces the sensitivity of the fibers to bacteria and moisture. However, this method is not carried out in the presence of water vapor. The composite material obtained emits odors and VOC that are too significant to meet the specifications for the manufacture of parts in the automotive field.

Composite materials based on natural lignocellulosic fibers whose odor and VOC emissions are reduced, are sought. The most common method is to introduce odor absorbers or perfumes into these composite materials, but these only mask unpleasant odors.

Alternative methods for reducing odor emissions and VOC of composite materials based on natural lignocellulosic fibers are therefore sought in order to prepare parts that remain compatible with automotive specifications.

This specification includes not only thermomechanical properties, but also injectability properties allowing the preparation of large parts at a reasonable cost.

However, one of the challenges of composite materials based on natural lignocellulosic fibers is also the ability to shape them by injection molding, in particular to form large parts. The injectability of the material must be sufficient to make it possible to prepare large parts by minimizing the number of injection points in the mold through which the molten material is injected. In fact, multiplying the number of injection points has a direct impact on the cost price of the formed part.

The development of a composite material based on natural lignocellulosic fibers offering reduced odor and VOC emissions and sufficiently injectable in the molten state, is therefore desireable.

For this purpose, according to a first object, the invention relates to a method for preparing a composite material comprising the steps of:
(i) heat treating natural lignocellulosic fibers at a temperature of 130 to 320° C., preferably from 130 to 300° C., for 2 minutes to 24 hours in an oxygen-deficient atmosphere in the presence of water vapor,
(ii) mixing the natural lignocellulosic fibers heat-treated with at least one thermoplastic polymer melt, and whose melting point is less than or equal to 230° C.

The heat treatment of step (i) makes it possible to avoid the disadvantages mentioned above and to obtain a composite material which:
emits less odor and VOC than a composite material comprising the same components in the same proportions, except that its natural lignocellulosic fibers have not undergone the heat treatment of step (i), and/or
is more easily injectable in the molten state than a composite material in the molten state comprising the same components in the same proportions, except that its natural lignocellulosic fibers have not undergone the heat treatment of step (i).

In addition, the parts prepared from the composite material obtained from the inventive method generally have thermomechanical properties, in particular properties of rigidity, shock resistance and thermal resistance, that are compatible with the automotive specifications.

Without wishing to be bound by particular theories, the inventors assume that the heat treatment would make it possible to:
at least partially eliminate the water, the odorous products and the VOC (methanol, acetic acid, furfural, etc.) present in the natural lignocellulosic fibers,
render lignocellulosic natural fibers less hygroscopic,
partially degrade the hemicellulose and the lignin of the natural lignocellulosic fibers which hold together the bundles of fibers, and which hold together the elementary fibers within these bundles, making it possible to facilitate the individualization of the bundles of fibers and/or the elementary fibers which allows a better dispersion of these in the polymer in the molten state.

Due to this better dispersion of the fibers in the polymer(s) in the molten state, the mixture formed in step (ii):
would be less viscous and more easily injectable, and
would lead to a composite material having improved mechanical properties.

In addition, the inventors postulate that:
the oxygen-deficient atmosphere would prevent the combustion of fibers, and
the presence of water vapor would participate in the evaporation of VOC.

Thus, the combined action of water vapor and heat would provide a composite material with low odor and VOC emissions, and the oxygen-deficient atmosphere would prevent fiber degradation through combustion.

A lignocellulosic natural fiber is mainly composed of cellulose, lignin, hemicellulose, pectin. Each fiber is in the form of a multilayer composite in which the lignin plays the role of a matrix coating the very rigid structuring element that is cellulose. Unit fibers, also called elementary fibers or individual fibers, are associated with each other in the form of a bundle of fibers.

The term "natural lignocellulosic fibers" is intended to refer to lignocellulosic fibrous materials derived from materials of plant origin. The lignocellulosic natural fibers are preferably selected from the group consisting of lignocellulosic plant fibers. Natural lignocellulosic fibers are:
extracted from seeds or fruit of the plant such as cotton, kapok, milkweed, or coconut;
extracted from the stem of the plant such as flax, hemp, jute, ramie, or kenaf;

extracted from plant leaves such as sisal, Manila hemp or abaca, henequen, raffia or agave;

extracted from the trunk of the plant such as wood ("softwood" and "hardwood"), or banana;

from herbaceous plants, such as switchgrass, miscanthus, bamboo, sorghum, esparto, or sabei communis; or extracted from the stem of agricultural waste, such as rice or wheat.

Generally, wood powder or wood flour is not considered to belong to lignocellulosic natural fibers.

The method may comprise, before step (i), a step of preparation of natural lignocellulosic fibers comprising the substeps of:

a) retting stems, then b) defibrating the rusty stems, then sieving to separate the lignocellulosic natural fibers from the hurds.

Retting is a "rotting" of the stems, which leads to the degradation of the pectic cements that give the cohesion of the fibers between them and with other tissues. Thus, retting facilitates the separation of the fibers from the rest of the stem. Retting in the fields is a commonly used method in Europe. Typically, the stems are spread on wet (and possibly watered) grounds. The retting usually lasts between 20 and 90 days, wherein this duration is adapted to the meteorological conditions and the level of retting desired. "Minimal retting" is retting for 20 to 25 days, for example for 20 days, while "maximum retting" retting for 80 to 90 days, for example for 90 days.

The defibration step is a mechanical separation of the fibers. Grinding may be effected between defibering and sieving, in particular to reduce the length of natural lignocellulosic fibers to the desired length.

The length of the natural lignocellulosic fibers used in step (i) may vary widely, depending on the applications envisaged for the composite material. Fibers are preferably used:

whose average length is between 0.1 and 10 mm, in particular from 0.1 to 3 mm, preferably from 0.1 to 2 mm and/or whose average diameter is between 40 and 200 µm, preferably between 50 and 150 µm, wherein such diameters correspond to the diameters of lignocellulosic natural fibers from the stem, which are in the form of bundles of fibers.

Different methods are possible for measuring the average length and average diameter of natural lignocellulosic fibers, for example by optical and electronic microscopy for certain fibers. Hi-Res, MorFI and Metso morphological analyzes are, however, generally more suitable. To have a rough mass distribution, vibrating banks with well-defined porosity sieves are used.

Natural lignocellulosic fibers of average length greater than 10 mm, generally lead to a viscous mixture during step (ii) that is therefore more difficult to inject. In addition, it is generally more difficult to precisely meter fibers of average length greater than 10 mm, which makes it difficult to add a specific amount of fiber to the polymer. However, this quantity must be quantifiable in order to obtain a composite material whose properties are identical from one batch to another.

Moreover, the thermomechanical properties, in particular the rigidity, of a composite material prepared from natural lignocellulosic fibers of average length less than 0.1 mm are generally less than for lengths greater than 0.1 mm.

The method comprises a step (i) of heat treatment of lignocellulosic natural fibers at a temperature of 130 to 320° C. for 2 minutes to 24 hours, typically from 130 to 300° C. for 2 minutes to 24 hours, in particular from 180 to 300° C. for 2 minutes to 8 hours, preferably 240 to 300° C. for 2 to 30 minutes, in an oxygen-deficient atmosphere and in the presence of water vapor.

A temperature of 130 to 320° C., especially 130 to 300° C., preferably 180 to 300° C., preferably 240 to 300° C. in step (i) and/or a pressure of 1 to 50 bar, especially from 2 to 50 bar, preferably from 2 to 10 bar, preferably from 2 to 5 bar, are particularly suitable for obtaining the advantageous effects described above. The hemicellulose of natural lignocellulosic fibers generally begins to degrade at 180° C. which causes the emission of VOC and odors. The heat treatment mainly degrades the hemicellulose, generally at least 5%, typically at least 10%, especially at least 15%, preferably at least 20% of hemicellulose lignocellulosic natural fibers used in step (i) For example, natural lignocellulosic fibers comprising 8.9±0.5% by weight of hemicellulose before step (i) have a proportion by weight of hemicellulose of 6.8±0.1% after step (i).

The heat treatment is carried out in the presence of water vapor. The water may be completely in the form of steam, or may be partly liquid and partly in vapor form.

The water may be introduced in liquid form and then heated in the heating chamber or may be introduced into the heating chamber in the form of steam at a temperature of between 100 and 150° C., preferably at a pressure of from 1 to 50 bar, typically from 2 to 50 bar, then optionally heated in the chamber if step (i) is performed at a temperature above the temperature at which the steam was introduced. Preferably, during step (i), water vapor at a temperature of between 100 and 150° C. is introduced continuously into the heating chamber and the gas phase formed during step (i) is continuously extracted from the chamber, whereby the gas phase, which comprises or is composed of water vapor and VOC, is eliminated. The heating chamber for implementing step (i) preferably comprises a water vapor inlet, an outlet provided with means for evacuating the gas phase, and possibly an inlet for inert gas. Controlling the inlet and outlet flows makes it possible to regulate the pressure within the chamber, which is generally from 1 to 50 bar, in particular from 2 to 50 bar, preferably from 2 to 10 bar, preferably from 2 to 5 bar.

By "oxygen-deficient atmosphere" is meant that it prevents the entry of air into the heating chamber during the heat treatment, so that the proportion of oxygen in the chamber is less than the proportion of oxygen in the air and/or that step (i) is carried out in an atmosphere at least partially, or totally, inert (with nitrogen or water vapor, for example). Generally, the atmosphere in which step (i) is carried out has a volume proportion of oxygen of less than 18%, for example less than 15%, preferably less than 10%, especially less than 3%, typically less than 2%, preferably less than 0.5%, wherein an oxygen-free atmosphere is more particularly preferred. Higher proportions of oxygen may in fact lead to the lignocellulosic natural fibers catching fire, or to the presence of combustion points on the fibers involving at least partial degradation thereof.

In step (i) a gaseous phase is formed which comprises, or even consists of, water vapor and VOC.

The heat treatment of step (i) may be carried out batchwise or continuously. When it is carried out continuously, the fibers may be brought into the enclosure by any means, for example by a moving or fluidized bed, by the screw of a screw reactor, by vibration, by a rotating drum.

The method then comprises a step (ii) of mixing the heat-treated natural lignocellulosic fibers with at least one thermoplastic polymer in the molten state and whose melting temperature is less than or equal to 230° C. The thermoplastic polymer (preferably each thermoplastic polymer when it is a mixture thereof) has a melting temperature of less than or equal to 230° C.

Advantageously, the natural lignocellulosic fibers obtained at the end of step (i) degrade at higher temperatures than natural lignocellulosic fibers that have not undergone such a step. In fact, the degradation temperature of the natural lignocellulosic fibers obtained at the end of step (i) is generally greater than 230° C., whereas that of untreated natural lignocellulosic fibers is generally of the order of 200° C., which makes it difficult to mix with a thermoplastic polymer having a melting point above 180° C. Step (i) of the method thus makes it possible to make a mixture with a thermoplastic polymer whose melting point is less than or equal to 230° C., and in particular from 140 to 230° C., for example 180 to 230° C., which makes it possible to prepare composite materials based on polymers different from those used with untreated lignocellulosic natural fibers.

Preferably, the mixture of step (ii) is carried out by extrusion. Advantageously, the shearing forces which are exerted during the extrusion participate in the individualization of the bundles of fibers and/or the elementary fibers, and therefore to a better dispersion of the fibers in the polymer in the molten state, which generally means that the mixture formed in step (ii):
  is less viscous and more easily injectable, and
  leads to a composite material having improved mechanical properties.

The thermoplastic polymer (or each of the thermoplastic polymers) is in particular chosen from:
  polyolefins, for example polyethylenes, polypropylenes or copolymers of ethylene and propylene,
  styrenic polymers such as acrylonitrile butadiene styrene (ABS) and polystyrene (PS),
  halogenated vinyl polymers such as polyvinyl chloride (PVC),
  biodegradable and/or biosourced polymers, such as cellulosic polymers such as cellulose acetate, biobased polyethylene, biobased polypropylene, plasticized starch-based mixtures, biodegradable and/or biobased polyesters such as poly lactic acid (PLA), polyalkanoates (PHA) and polybutylene succinate,
  polyamides, in particular polyamides 11, 6, 6-10 and 12, and
  thermoplastic elastomers (TPE) such as polyethylene oxide (POE), polystyrene-b-polybutadiene-b-polystyrene (SBS), polystyrene-b-poly (ethylene-butylene)-b-polystyrene (SEBS), thermoplastic polyurethane polymers (TPU), polyether-b-amide (PEBA).
wherein a polyolefin is particularly preferred, for example a polyethylene, a polypropylene or a copolymer of ethylene and propylene.

Typically, the thermoplastic polymer (or each of the thermoplastic polymers) has a melt index of 5 to 150 g/10 min, especially 25 to 150 g/10 min, preferably 45 to 125 g/10 min, at 230° C. under a load of 2.16 kg, especially when the thermoplastic polymer is a polyolefin.

The term "flow index" (FI), often referred to as the MFI (Melt Flow Index) or MFR (Melt Flow Rate), refers to the hot fluidity of a polymer such as evaluated by the flow rate of the polymer melt at a given temperature, through a capillary normalized for a given period, generally 10 minutes, under a load of 2.16 kg, under the conditions indicated in the international standard ISO 1133-1 of 2011.

Preferably, the thermoplastic polymer (or the mixture thereof) forms the matrix of the composite material obtained. By the term "matrix" is meant in a composite material the continuous phase in which the other components are dispersed. Generally, but not always, the matrix is formed by the component present in majority proportion.

The mass proportion of thermoplastic polymer(s) in the mixture formed in step (ii) (and thus in the composite material obtained) is generally 40 to 80%, especially 55 to 75%. These proportions are adapted so that the mixture formed in step (ii) is easily injectable and for the thermoplastic polymer (or the mixture thereof) to form the matrix of the composite material obtained.

The mixture formed in step (ii) comprises the natural lignocellulosic fibers obtained in step (i), generally in a mass proportion in the mixture (and thus in the obtained composite material) of 10 to 58%, preferably 10 to 57.9%, especially 10 to 30%. For higher proportions, the mixture is generally very viscous and difficult to inject, which makes it difficult to prepare large parts such as panel body inserts. The injection behavior is optimum for less than 30% by weight of natural lignocellulosic fibers.

The mixture formed in step (ii) may comprise other polymers and/or additives, especially chosen from a high MFI polymer, a shock modifier, a compatibilizing agent, an antioxidant (used alone or as a mixture of antioxidants), a VOC scavenger and a mixture thereof.

The high MFI polymer generally has a melt index of 500 to 2000 g/10 min at 230° C. under a load of 2.16 kg, preferably 500 to 1500 g/10 min. The high MFI polymer makes it possible to increase the fluidity of the mixture so as to make it possible to inject large pieces such as panel body inserts. Such a polymer may, in particular, be used when the thermoplastic polymer is a polyolefin, especially a polypropylene or a copolymer of ethylene and propylene.

The high MFI polymer is generally chosen to be structurally close to the thermoplastic polymer used in step (ii), i.e. at least some of the constituent units of the high MFI polymer are identical to at least some of the constituent units of the thermoplastic polymer. When the thermoplastic polymer is a propylene homopolymer or a copolymer of ethylene and propylene, the preferred high MFI polymer is polypropylene, preferably polypropylene homopolymer, especially polypropylene homopolymer obtained by metallocene catalysis.

The mass proportion of high MFI polymer in the mixture formed in step (ii) (and thus in the composite material obtained) is generally from 0 to 20%, typically from 0.1 to 20%, especially from 1 to 15%, preferably from 3 to 12%.

The term "impact modifier" refers to agents added to a material in order to improve the properties of shock resistance. These modifiers are polymers or molecules that form multiphase systems with the matrix or that react chemically with the matrix, thus improving its resilience. For example, an ethylene-octene copolymer may be used as impact modifier when the thermoplastic polymer is a polyolefin.

The addition of the impact modifier makes it possible to increase the shock resistance of the composite material by up to 200%.

The mass proportion of impact modifier in the mixture formed in step (ii) (and therefore in the composite material obtained) is generally from 0 to 20%, especially from 1 to 20%, preferably from 3 to 15%.

The term "compatibilizing agent" refers to compounds having two ends of different chemical structure respectively having a particular affinity for two components of a heterogeneous material, thereby making it possible to improve the compatibility between these two components.

The compatibilizing agent ensures good affinity between the natural lignocellulosic fibers and the other components of the mixture, in particular the thermoplastic polymer(s), and thus makes it possible to obtain a homogeneous mixture.

When the thermoplastic polymer is a propylene homopolymer or a copolymer of ethylene and propylene, the compatibilizing agent is preferably chosen from polyolefins grafted with maleic acid and/or maleic anhydride. Mention may be made of (co)polymers of polypropylene as polyolefins that may be used.

The mass proportion of compatibilizing agent in the mixture formed in step (ii) (and therefore in the composite material obtained) is generally from 0.5 to 10%, especially from 0.5 to 5%.

Preferably, the mixture formed in step (ii) comprises, or even consists of:
(a) from 40 to 80% by weight, in particular from 55 to 75% by weight of thermoplastic polymer(s), preferably having a melt index of from 5 to 150 g/10 min, in particular from 25 to 150 g/10 min, preferably 45 to 125 g/10 min, at 230° C. under a load of 2.16 kg;
(b) from 0 to 20% by weight, preferably from 0.1 to 20% by weight, especially from 3 to 12% of a polymer having a melt index of 500 to 2000 g/10 min at 230° C. under a load of 2.16 kg, preferably 500 to 1500 g/10 min;
(c) from 0 to 20% by weight, preferably from 1 to 20% by weight, especially from 3 to 15% by weight, of an impact modifier;
(d) from 0.5 to 10% by weight, especially from 0.5 to 5% by weight, of a compatibilizer; and
(e) from 10 to 58%, preferably from 10 to 57.9% by weight, in particular from 10 to 30% by weight of natural lignocellulosic fibers obtained in step (i).

The components (a), (b), (c) and (d) of the mixture formed in step (ii) are generally polymers. Typically, the mixture is polymer-free other than those of components (a), (b), (c) and (d).

Cooling the mixture formed in step (ii) makes it possible to obtain the composite material.

The composite material may be in the form of granules. The method then comprises, after step (ii), a granulation step, for example by extrusion compounding.

The composite material may be in the form of molded material. The method may comprise, after step (ii) or after the granulation step, an injection molding step in order to obtain the composite material in the form of molded material.

Typically, the method comprises the steps of:
(i) heat treating natural lignocellulosic fibers at a temperature of 130 to 320° C., typically from 130 to 300° C. for 2 minutes to 24 hours, in particular from 180 to 300° C. for 2 minutes to 8 hours, preferably from 240 to at 300° C. for 2 to 30 min, in an oxygen-deficient atmosphere and in the presence of water vapor,
(ii) mixing the heat treated natural lignocellulosic fibers with at least one melt thermoplastic polymer and having a melting temperature of 230° C. or lower;
(iii) granulating the mixture obtained in step (ii) to obtain the composite material in the form of granules,
(iv) injecting the granules to obtain the composite material in the form of molded material.

Preferably, the steps (ii) to (iii) are carried out in a screw extruder, such as a twin-screw, single-screw, planetary extruder and preferably a single-screw extruder (Buss Kneader® type) which limits the shear and an extruder twin screw with a screw profile adapted to natural lignocellulosic fibers.

According to a second object, the invention relates to the composite material that obtainable by this method.

The composite material is generally in the form of granules, which are typically capable of being used for the manufacture of parts by injection.

The composite material generally has:
an odor emission rate as measured according to the VDA 270 automotive specifications less than or equal to 3.5, in particular less than or equal to 3.0,
and/or a VOC emission rate as measured according to the VDA 278 automotive specifications less than 100 μg/g, in particular less than or equal to 75 μg/g.

According to a third object, the invention relates to the use of natural lignocellulosic fibers obtained by heat treatment at a temperature of 130 to 320° C., preferably from 130 to 300° C., for 2 minutes to 24 hours in an oxygen-deficient atmosphere in the presence of water vapor to reduce emissions of odors and volatile organic compounds from a composite material comprising natural lignocellulosic fibers and at least one thermoplastic polymer (which may be in the cured state). The volatile organic compounds are, in particular, chosen from methanol, acetic acid, furfural and a mixture thereof.

The invention also relates to a method for reducing odor emissions and volatile organic compounds of a composite material comprising lignocellulosic natural fibers and at least one thermoplastic polymer comprising the steps of:
(i) heat treating natural lignocellulosic fibers at a temperature of 130 to 320° C., preferably from 130 to 300° C., for 2 minutes to 24 hours in an oxygen-deficient atmosphere and in the presence of water vapor,
(ii) mixing the heat-treated natural lignocellulosic fibers with at least one thermoplastic polymer in the molten state and whose melting point is less than or equal to 230° C.

The composite material has reduced odor and VOC emission rates compared to a composite material comprising the same components in the same proportions but whose natural lignocellulosic fibers have not undergone the heat treatment of step (i). The VDA 270 for odor emissions and VDA 278 for VOC emissions specifications may be used to quantify these emissions.

According to a fourth subject, the invention relates to the use of natural lignocellulosic fibers obtained by heat treatment at a temperature of 130 to 320° C., preferably from 130 to 300° C., for 2 minutes to 24 hours in an oxygen-deficient atmosphere in the presence of water vapor to improve the rigidity of a composite material comprising lignocellulosic natural fibers and at least one thermoplastic polymer (which may be in the cured state).

The invention also relates to a method for improving the stiffness of a composite material comprising lignocellulosic natural fibers and at least one thermoplastic polymer comprising the steps of:
(i) heat treating natural lignocellulosic fibers at a temperature of 130 to 320° C., preferably from 130 to 300° C., for 2 minutes to 24 hours in an oxygen-deficient atmosphere and in the presence of water vapor,
(ii) mixing the heat treated natural lignocellulosic fibers with at least one thermoplastic polymer in the molten state and whose melting point is less than or equal to 230° C.

The composite material obtained is more rigid than a composite material comprising the same components in the same proportions but whose natural lignocellulosic fibers have not undergone the heat treatment of step (i). The improvement in rigidity may be demonstrated by measuring the modulus of elasticity at 23° C. according to the ISO 527 standard of 2012.

According to a sixth object, the invention relates to the use of natural lignocellulosic fibers obtained by heat treatment at a temperature of 130 to 320° C., in particular from 130 to 300° C., for 2 minutes to 24 hours in an oxygen-deficient atmosphere in the presence of water vapor to improve the injectability of a composite material and comprising natural lignocellulosic fibers and at least one thermoplastic polymer in the molten state.

The invention also relates to a method for improving the injectability of a composite material comprising natural lignocellulosic fibers and at least one thermoplastic polymer in the molten state comprising the steps of:
(i) heat treating natural lignocellulosic fibers at a temperature of 130 to 320° C., preferably from 130 to 300° C., for 2 minutes to 24 hours in an oxygen-deficient atmosphere in the presence of water vapor,
(ii) mixing the heat treated natural lignocellulosic fibers with at least one thermoplastic polymer in the molten state and whose melting point is less than or equal to 230° C.

Injectability may be measured by the spiral flow test, which is a measure of the viscosity of resins in a spiral-shaped mold (e.g. AIM Insert Spiral Flow "Axxicon" mold (3 mm)) having a section thickness and a specified circular flow path length (sample sizes: 1150×5×3 mm). The cross-section of the mold is constant. Composite materials are evaluated under typical injection molding conditions. The length of the flow in the mold is a function of the viscosity of the composite material, the injection pressure, the filling ratio, and the injection temperature. To compare the injectability of two composite materials, therefore, comparative tests should be performed at the same injection pressures, fill rates, and injection temperatures. The injection conditions used determine the final length of the spiral formed by the composite material injected into the mold. There is no holding phase because there is no end in the mold. As the cross-section of the mold is constant, the flow rate is constant. Flow values of 12, 30, 40 and 50 cm³/s are generally used in different tests. The composite material is melt-injected to a maximum pressure value, which is determined by the fact that the material must reach all the sensors in the mold.

According to a seventh object, the invention relates to the use of the composite material described above for the preparation of vehicle parts, preferably of automobile parts, in particular for the preparation of interior parts of automobiles, such as for example dashboards, door panels.

The invention also relates to a method for preparing vehicle parts comprising injecting the composite material as defined above into a mold. The embodiments described above are of course applicable. The invention also relates to a method for preparing a vehicle part comprising steps (i) and (ii) as defined above, whereby a composite material is obtained, then a step (iv') of injection of the composite material into a mold, whereby the vehicle part is obtained. The embodiments described above are, of course, applicable. When this part preparation method comprises a step (iii) of granulation of the mixture obtained in step (ii) to obtain the composite material in the form of granules, step (iv') is identical to step (iv) defined above (the composite material in the form of molded material then corresponding to the part).

The invention also relates to the vehicle part that obtainable by this method.

The invention also relates to vehicle parts that obtainable from the composite material.

The invention will be explained in more detail by means of the examples which follow, given purely by way of illustration.

EXAMPLE

Hemp fibers provided by APM TF (length less than 2 mm and diameters between 40 and 150 μm) derived from fibers which have undergone minimal retting have been heat-treated in a heating chamber at 260° C. for 10 min in an oxygen-deficient atmosphere and in the presence of water vapor injected under pressure (2 bar) and 150° C. step (i).

In a Buss Kneader-type extruder, 51.5 kg of the propylene-ethylene copolymer (Borealis BH345M0), MFI 45 g/10 min as thermoplastic polymer, 10 kg of polypropylene homopolymer (Borflow HL508FB) were introduced through a first Borealis hopper) of MFI 800 g/10 min as high MFI polymer, 11 kg of the ethylene-octene copolymer impact modifier (Exact 8201 from Exxon Mobil Chemical) and 2.5 kg of the maleic anhydride grafted polypropylene compatibilizer (Orevac CA100 from Arkema) then 25 kg of heat-treated hemp fibers according to the conditions defined above, half of which is introduced by means of a second hopper located downstream.

TABLE 1

| Composition of the composite material | |
|---|---|
| Component | Proportion [% by weight] |
| Propylene-Ethylene Copolymer | 51.5 |
| Homopolymer (high MFI polymer) | 10 |
| Impact modifier | 11 |
| Compatibilizer | 2.5 |
| Heat-treated hemp fibers | 25 |

The mixture was extrusion compounded under the following conditions: Temperature 190° C.;
Pressure: 5 to 30 Bar The composite material was obtained in the form of granules that could be used for the production of parts by injection.

TABLE 2

| | | Mechanical, thermal, and rheological properties profile | | |
|---|---|---|---|---|
| Properties | Unit | Composite material with hemp fiber not heat treated (Comparative) | Composite material with heat-treated hemp fibers in the presence of water vapor | Material composite with hemp fibers which were heat-treated but in the absence of water vapor (comparative) |
| Modulus of elasticity at 23° C. (ISO 527) | MPa | 2 975 | 3 275 | 3 100 |

TABLE 2-continued

Mechanical, thermal, and rheological properties profile

| Properties | Unit | Composite material with hemp fiber not heat treated (Comparative) | Composite material with heat-treated hemp fibers in the presence of water vapor | Material composite with hemp fibers which were heat-treated but in the absence of water vapor (comparative) |
|---|---|---|---|---|
| Spiral flow length (T ° C.: 185° C.) | cm | 57 | 68 | 65 |
| Odor (VDA 270) | | 3.8 | 2.9 | 3.5 |
| VOC (VDA 278) | µg/g | 120 | 70 | 95 |

As demonstrated by the results in Table 2, the composite material prepared from thermally treated hemp fiber in the presence of water vapor is 10% more rigid, 20% more injectable, with 20% to 30% lower emissions, than that obtained with the same composition except to use heat-treated hemp fibers (without step (i)—comparative).

By virtue of the heat treatment of the fibers, the composite material obtained is injectable at 220° C., with a flow length of 110 cm. This composite material is therefore particularly suitable for the preparation of large automotive parts.

The invention claimed is:

1. A method of preparing a vehicle part comprising the steps of:
   (i) heat treating natural lignocellulosic fibers in a chamber at a temperature of 130 to 320° C., for 2 minutes to 24 hours in an oxygen-deficient atmosphere and in the presence of water vapor, wherein water vapor is continuously introduced into the chamber and a gas phase comprising water vapor and volatile organic compounds (VOCs) is continuously extracted from the chamber,
   (ii) mixing the heat-treated lignocellulosic natural fibers with at least one thermoplastic polymer in a molten state and whose melting point is less than or equal to 230° C., whereby a composite material is obtained, and
   (iii) injecting the composite material into a mold, whereby the vehicle part is obtained.

2. The method according to claim 1, wherein the natural lignocellulosic fibers are:
   extracted from seeds or fruit of a plant;
   extracted from a stem of a plant;
   extracted from plant leaves;
   extracted from a trunk of a plant;
   extracted from herbaceous plants; or
   extracted from a stem of agricultural waste.

3. The method according to claim 1, comprising, before step (i), a step of preparation of lignocellulosic natural fibers comprising the substeps of:
   a) retting stems, then
   b) defibration of the retted stems, then sieving to separate the lignocellulosic natural fibers from a residues.

4. The method according to claim 1, wherein the natural lignocellulosic fibers have:
   an average length of between 0.1 and 10 mm, and/or
   an average diameter of between 40 and 200 µm.

5. The method according to claim 1, wherein step (i) is carried out at a temperature of 180 to 300° C. for 2 min to 8 h.

6. The method according to claim 1, wherein a pressure in step (i) is 1 to 50 bar.

7. The method according to claim 1, wherein:
   water vapor is introduced into the chamber continuously at a temperature of between 100 and 150° C., and
   the gas phase is extracted continuously, so that a pressure within the chamber is 1 to 50 bar.

8. The method according to claim 1, wherein an atmosphere in which step (i) is carried out has a volume proportion of oxygen of less than 18%.

9. The method according to claim 1, wherein the at least one thermoplastic polymer is selected from:
   polyolefins,
   styrenic polymers,
   halogenated vinyl polymers,
   biodegradable and/or biosourced polymers,
   polyamides, and
   thermoplastic elastomers.

10. The method according to claim 1, wherein the mixture formed in step (ii) comprises:
    (a) from 40 to 80% by weight of thermoplastic polymer (s);
    (b) from 0 to 20% by weight of a polymer having a melt index of 500 to 2000 g/10 min at 230° C. under a load of 2.16 kg;
    (c) from 0 to 20% by weight of an impact modifier;
    (d) from 0.5 to 10% by weight, of a compatibilizer; and
    (e) from 10 to 60% by weight of natural lignocellulosic fibers obtained in step (i).

11. The method according to claim 1, wherein the natural lignocellulosic fibers are:
    extracted from seeds or fruit of cotton, kapok, milkweed, coconut, or any combination thereof,
    extracted from a stem of flax, hemp, jute, ramie, kenaf, or any combination thereof,
    extracted from leaves of sisal, Manila hemp or abaca, henequen, raffia, agave, or any combination thereof,
    extracted from wood or a trunk of banana tree or any combination thereof,
    extracted from switchgrass, miscanthus, bamboo, sorghum, esparto, sabei communis, or any combination thereof, or
    extracted from a stem of agricultural waste of rice or wheat or any combination thereof.

12. The method according to claim 1, wherein the at least one thermoplastic polymer is selected from:
    polyethylenes, polypropylenes, or copolymers of ethylene and propylene,
    acrylonitrile butadiene styrene (ABS) or polystyrene (PS),
    polyvinyl chloride (PVC),
    cellulose acetate, biobased polyethylene, biobased polypropylene, plasticized starch-based mixtures, poly lactic acid (PLA), polyalkanoates (PHAs), or polybutylene succinate,
    polyamide 11, polyamide 6, polyamide 6-10, or polyamide 12, and
    polyethylene oxide (POE), polystyrene-b-polybutadiene-b-polystyrene (SBS), polystyrene-b-poly (ethylene-butylene) -b-polystyrene (SEBS), thermoplastic polyurethane polymers (TPU), or polyether-b-amide (PEBA).

13. A method for preparing a composite material, comprising the steps of:
 (i) heat treating natural lignocellulosic fibers in a chamber at a temperature of 130 to 320° C., for 2 minutes to 24 hours in an oxygen-deficient atmosphere and in the presence of water vapor, wherein water vapor is continuously introduced into the chamber and a gas phase comprising water vapor and volatile organic compounds (VOCs) is continuously extracted from the chamber,
 (ii) mixing the heat-treated natural lignocellulosic fibers with at least one thermoplastic polymer in a molten state and whose melting point is less than or equal to 230° C., whereby the composite material is obtained.

14. A method for improving injectability of a vehicle part comprising natural lignocellulosic fibers and at least one thermoplastic polymer in the molten state, comprising the steps of:
 (i) heat treating natural lignocellulosic fibers in a chamber at a temperature of 130 to 320° C., for 2 minutes to 24 hours in an oxygen-deficient atmosphere and in the presence of water vapor, wherein water vapor is continuously introduced into the chamber and a gas phase comprising water vapor and volatile organic compounds (VOCs) is continuously extracted from the chamber, and
 (ii) mixing the heat-treated natural lignocellulosic fibers with at least one thermoplastic polymer in a molten state and whose melting point is less than or equal to 230° C., whereby a composite material is obtained, and
 (iii) injecting the composite material into a mold, whereby the vehicle part is obtained.

* * * * *